United States Patent

[11] 3,623,686

[72] Inventor Aurelien P. Dupuis
 39 Stanley St., Sudbury, Ontario, Canada
[21] Appl. No. 878,406
[22] Filed Nov. 20, 1969
[45] Patented Nov. 30, 1971

[54] PIPE HANGERS
 4 Claims, 4 Drawing Figs.
[52] U.S. Cl. ............................................. 248/60,
 248/70
[51] Int. Cl. ............................................. F16l 3/12
[50] Field of Search ........................... 248/60, 59,
 62, 74; 24/237, 236

[56] References Cited
 UNITED STATES PATENTS

| | | | |
|---|---|---|---|
| 623,155 | 4/1899 | Hubbard | 24/236 |
| 803,819 | 11/1905 | Getz | 248/74 X |
| 1,194,809 | 8/1916 | Bigney | 24/236 |
| 1,450,640 | 4/1923 | Norman | 248/62 X |
| 2,466,247 | 4/1949 | Land | 248/62 |
| 2,714,497 | 8/1955 | Denis | 248/62 |
| 2,947,055 | 8/1960 | McHenry | 24/237 X |

*Primary Examiner*—Chancellor E. Harris
*Attorney*—W. Britton Moore

ABSTRACT: A pipe hanger comprises a headpiece having first and second spaced apart and downwardly extending legs. A resilient cradle strap, usefully comprising a plurality of plies, is permanently secured at one end to one of the legs of the headpiece, while at its other end, the cradle strap carries a hooklike member which is received in a restricted transverse opening or slot in proximity to the lower end of the second leg of the headpiece for detachable securement of that end of the cradle strap to the headpiece, the hooklike member being urged by the resilience of the cradle strap against movement out of such an opening and preferably requiring the cradle strap to be deformed outwardly to permit such movement. A resilient tongue which must also be manually depressed before the hooklike member can be removed from the slot is usefully provided further to prevent accidental detachment of the cradle strap from the headpiece.

PATENTED NOV 30 1971

3,623,686

INVENTOR:
AURELIEN P. DUPUIS
BY W Britton Moore
ATTORNEY

PIPE HANGERS

BACKGROUND OF THE INVENTION

The present invention relates to pipe cradle and more particularly to a pipe hanger comprising a cradle strap, one end of which is secured to one leg of a head piece while the other end of which is detachably secured to a second leg of such a head piece, such detachable securement permitting the cradle of such a hanger to be opened for the removal or insertion of an elongated member such as a pipe into the cradle.

It is a principal object of the present invention to provide a pipe hanger of the aforementioned type and which hanger is characterized by its simplicity of construction and by its reliability in use.

It is a further object of this invention to provide a pipe hanger of the type already identified and which hanger comprises a resilient cradle strap usefully formed of two or more plies of a resilient material such as spring steel.

Yet another object in accordance with a preferred feature of the present invention is to provide a pipe hanger comprising novel means for detachably but positively securing one end of the cradle strap to the head piece of the hanger.

SUMMARY OF THE INVENTION

In its broadest scope, the present invention provides a pipe hanger comprising a headpiece adapted for mounting said hanger on a structural member and having first and second downwardly extending spaced apart legs, and resilient and elongated cradle strap having first and second ends, said first end of said cradle strap being secured to said first leg of said headpiece and said second end of said strap being adapted to be secured detachably to said second leg of said head piece and to be hindered from disengagement therewith by virtue of the resilience of said cradle strap.

Other objects, features and advantages will become apparent as the description herein proceeds.

BRIEF DESCRIPTION OF THE DRAWINGS

The invention will now be described merely by way of illustration with reference to the accompanying drawings in which.

DESCRIPTION OF THE PREFERRED EMBODIMENT

Figure 1:
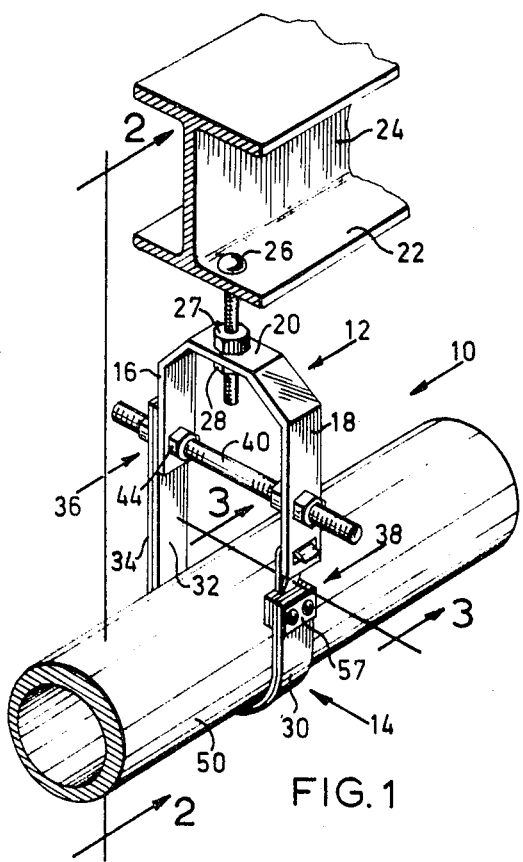
FIG. 1 is a perspective view of a preferred embodiment of a pipe hanger in accordance with the present invention showing the hanger mounted from the undersurface of a structural I-beam and supporting in its cradle a pipe which is illustrated fragmentarily.

The pipe hanger indicated generally at 10 in the accompanying drawings comprises a headpiece generally indicated at 12 and a cradle generally indicated at 14. The headpiece 12 has an inverted U-shaped configuration and has first and second spaced apart and downwardly extending legs 16 and 18 respectively interconnected by a base 20. The hanger 10 is shown by way of illustration as being secured to a lower flange 22 of a structural I-beam 24 by means of a bolt 26 and nuts 27 and 28. It will be appreciated that, by such use of a long bolt 26, vertical height adjustment of the hanger 10 is possible.

In the particular embodiment illustrated in the accompanying drawings, the cradle 14 comprises an elongated resilient cradle strap 30 comprising two plies 32 and 34 of spring steel. The cradle strap 30 has a first end 36 and a second end 38 and is secured at its first end 36 to the first leg 16 of the head piece 12 by a bolt 40 which extends through the first end 36 of the cradle strap 30 and through the first and second legs 16 and 18 respectively of the head piece 12. Nuts 42 and 44 threaded on the bolt 40 serve to secure the first end 36 of the cradle strap 30 to the first leg 16 of the head piece 12 while nuts 46 and 48 secure the bolt 40 to the second leg of the headpiece 12.

The second end 38 of the cradle strap 30 is adapted to be secured detachably to the second leg 18 of the headpiece 12 to provide the cradle 14 in which an elongated member such as pipe 50 may be supported. To this end, a hooklike member 52 is secured to the second end 38 of the cradle strap 30, for example, by rivets 54. A resilient tongue 56, for example, of spring steel is secured by these same rivets 54 to the second end 38 of the cradle strap 30 and extends upwardly therefrom and outwardly of the hooklike member 52 as is best seen by reference to FIGS. 2 and 3. A reinforcing plate 57 is provided on the outer surface of the cradle strap 30 at the second end 38 thereof as shown. An opening or slot 58 is provided in the second leg 18 of the head piece 12 below the bolt 40 for receiving the hooklike member 52 therethrough as is shown in the accompanying drawings.

Figure 2:
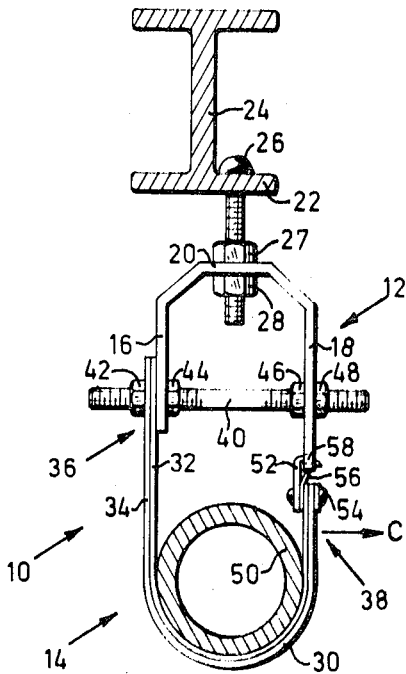
FIG. 2 is an elevation of the pipe hanger of FIG. 1 when viewed in the direction of the arrows 2—2 of FIG. 1.
Figure 3:
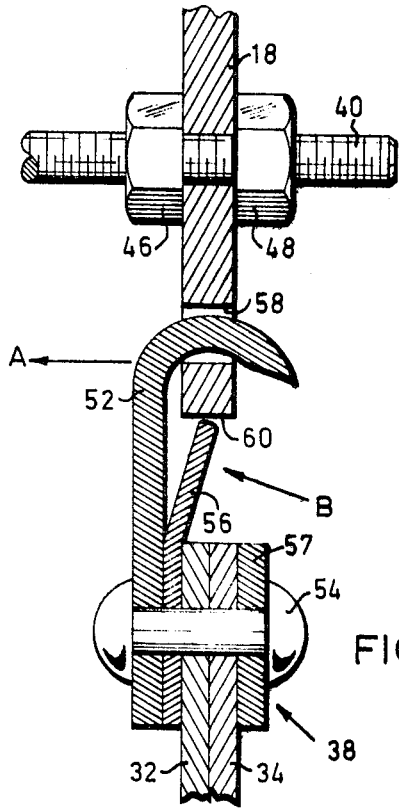
FIG. 3 is a fragmentary and enlarged vertical sectional view through the pipe hanger of FIG. 1 when taken along the line 3—3 of FIG. 1 showing the second end of the cradle strap thereof detachably secured to the second leg of the head piece.

It should be noted that the vertical extent of the opening or slot 58 is insufficient to permit the hooklike member 52 normally to be moved transversely therethrough in the direction of the arrow 'A' of FIG. 3 to permit detachment of the cradle strap 30 from the second leg 18 of the headpiece 12. In order to detach the hooklike member 52 from the second leg 18 of the head piece 12, it is first necessary to twist this hooklike member 52 against the resilience of the cradle strap 30 to the position actually shown in FIG. 4. It will be appreciated, however, that, with the hooklike member 52 disposed in its normal disposition as shown in FIGS. 2 and 3, such twisting movement of the hooklike member 52 to an extent sufficient to permit its transverse movement through the opening or slot 58 will be prevented by terminal engagement of the resilient tongue 56 and the lower end surface 60 of the second leg 18 of the headpiece 12.

Figure 4:
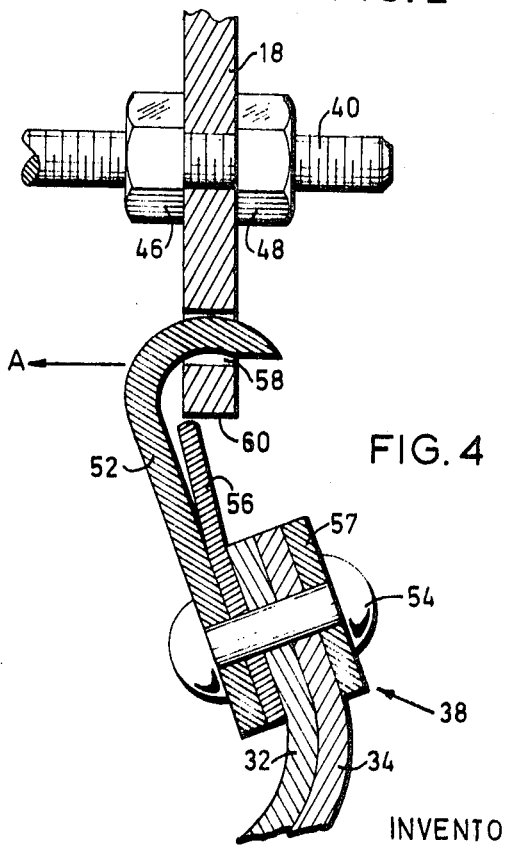
FIG. 4 is a fragmentary and enlarged vertical sectional view similar to that of FIG. 3 but showing the second end of the cradle strap about to be released from its securement with the second leg of the head piece.

In order to detach the cradle strap 30 from the second leg 18 of the headpiece 12, it is necessary first manually to press the resilient tongue 56 in the direction of the arrow 'B' of FIG. 3 and then to twist the second end 38 of the cradle strap 30 to the position shown in FIG. 4. The hooklike member 52 can then be moved in the direction of the arrow 'A' (FIG. 4).

It will now be understood that the preferred means hereinbefore described for detachably securing the second end 38 of the cradle strap 30 to the second leg 18 of the head piece 12 is particularly advantageous in that it practically completely eliminates all danger of accidental detachment of these members. Further reduction of this danger results from the weight of the supported member such as pipe 50 acting downwardly on the hooklike member 52 to hold this member in its locked position as shown in FIG. 3. The resiliency of the cradle strap 30 serves in accordance with an important and essential feature of this invention to urge the hooklike member 52 outwardly as indicated by the arrow 'C' in FIG. 2 as well as permitting the twisting of the hooklike member 52 to the position shown in FIG. 4 when required so significantly reducing the risk of accidental detachment even if the tongue 56 is not provided as hereinbefore described.

Although the cradle strap has been shown as comprising two separate plies, it may be desirable in accordance with the invention to make use of a larger number of such plies in order to obtain the desired combination of strength and resiliency. It will also be understood that other modifications may be made to the pipe hanger shown in the accompanying drawings without departing from the scope of the invention as defined by the claims appended hereto. Merely by way of illustration, it may be mentioned that the headpiece 12 may be adapted to be mounted directly on a structural member 22. Similarly, the bolt 40 and the nuts 42, 44, 46 and 48 threaded thereon may be omitted provided that the legs 16 and 18 of the head piece 12 are sufficiently short and strong to provide adequate rigidity to the latter member.

What is claimed is:

1. A pipe hanger comprising a head piece adapted for mounting said hanger on a structural member and having first and second downwardly extending spaced apart legs with an opening extending transversely through said second leg thereof, a resiliently closable elongated cradle strap having first and second ends, said first end of said cradle strap being rigidly secured to said first leg of said headpiece and a hooklike member secured to said second end of said cradle strap for transverse outward extension of said hooklike member through said opening in said second leg of said headpiece thereby detachably to secure said second end of said cradle strap to said second leg of said headpiece said hooklike member being urged outwardly by the resilience of said cradle strap and said opening through said second leg of said headpiece being so dimensioned that said hooklike member cannot be moved inwardly out of said opening until said cradle strap is resiliently deformed thereby to hinder accidental disengagement of said cradle strap from said headpiece.

2. A pipe hanger as claimed in claim 1 in which said second end of said cradle strap has additionally secured thereto a resilient tongue adapted normally to engage said second leg of said headpiece terminally thereof to prevent such resilient deformation of said cradle strap and in turn to prevent removal of said hooklike member from its disposition through said opening in said second leg of said headpiece but to permit said removal therefrom after the manual application of pressure to said resilient tongue.

3. A pipe hanger as claimed in claim 2 in which, when said second end of said cradle strap is detachably secured to said second leg of said headpiece, said resilient tongue normally engages said second leg of said headpiece terminally thereof to restrict outward resilient deformation of said second end of said cradle strap in turn to prevent said inwardly directed passage of said free end of said hooklike member through said opening but, on the application of inwardly directed manual pressure against said resilient tongue, said outward resilient deformation of said second end of said cradle strap is no longer so restricted.

4. A pipe hanger as claimed in claim 1 in which said resilient cradle strap is spring steel.

* * * * *